March 6, 1951 L. A. BLACKBURN 2,544,485
CHAIN STRUCTURE
Filed Sept. 14, 1946
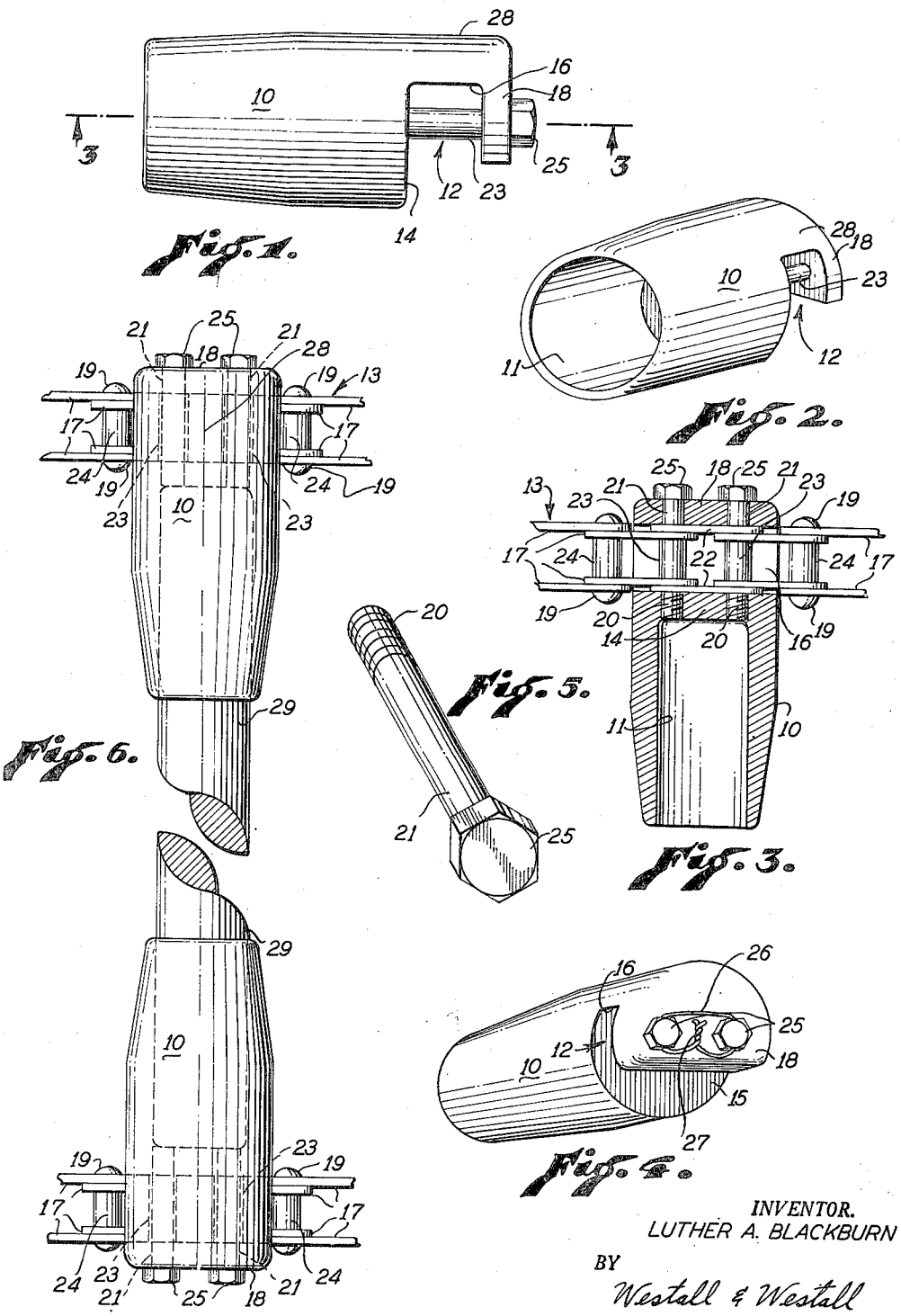
INVENTOR.
LUTHER A. BLACKBURN
BY
Westall & Westall
ATTORNEYS Patented Mar. 6, 1951

2,544,485

UNITED STATES PATENT OFFICE 2,544,485

CHAIN STRUCTURE

Luther A. Blackburn, Lynwood, Calif.

Application September 14, 1946, Serial No. 696,986

6 Claims. (Cl. 74—245)

This invention relates generally to chain structures, and more particularly pertains to master links for chains incorporating a coupling adapted for the transmission of power between the chain and auxiliary equipment. This application is a continuation in part of my co-pending application, Serial No. 602,911, filed July 2, 1945.

Endless chains supported or driven by sprockets have heretofore been embodied in apparatus of many types for effecting the transmission of power between various mechanisms where it is necessary to transpose rotary motion into straight motion, or vice versa. Modern oil well pumping units utilize such expedients for transmitting the driving force of the pump engine to the polished rod assembly extending into the well for reciprocation of the pump plunger. In accordance with the most practical embodiment of such apparatus, endless chains are arranged vertically at opposite sides of the well, the upper end of the polished rod being secured in a crosshead carried by and arranged between correspondingly-moving reaches of the respective chains. The lateral displacement of the upwardly and downwardly moving reaches of respective chains is compensated by blocks secured to the chains and movable laterally within the crosshead frame. The blocks are pivotally connected to links of respective chains in a manner which permits the blocks to follow the chains over their respective sprockets at the ends of the strokes of the crosshead.

Heretofore in the art, many of such apparatus embodied a more or less rigid connection between the crosshead and chains, and any lateral misalignment of the points of connection between the respective chains and the opposite sides of the crosshead inevitably impose an undue strain upon the chain elements which, for many utilities, especially where heavy loads were to be carried, made the use of such mechanism extremely hazardous. Perfect alignment of these connections is very difficult, and even if initially effected, cannot be maintained because of the number of loose or pivotally associated parts in the drive mechanism, e. g., in the number of links in the chains, the play in which must be taken up each time the assembly is put in operation. If the load carried by the drive mechanism varies to any appreciable extent during its operation, the degree to which this play is absorbed is not always correspondingly effected in all chains. Moreover, the tendency of the elements to stretch in response to the tension of a continuously varying load further complicates the problem of maintaining the requisite alignment or compensation for misalignment between such elements.

It is a general object of the present invention to provide master links for incorporation in chain structures, adapted to accommodate a connecting rod comprising a part of, and laterally projecting from, auxiliary mechanism to drive, or to be actuated by, the chains. While, to this extent, the utility of the novel device hereof is substantially the same as that of the invention of my co-pending application referred to, an object peculiar to the present apparatus is the provision of a master link essentially simple in construction and economical of manufacture.

More specifically, an object is to provide a chain assembly of the character above alluded to, embodying, with a lateral coupling, a device for the independent pivotal association of opposed reaches of the chain and to form therebetween a separate link functionally identical with the other links of the chain.

Another object is the provision of a composite chain structure incorporating a pair of spaced parallel endless chains in combination with a flexible and extensible assembly comprising a pair of master links to permit continuous self-adjustment of the elements thereof during operation and compensation for misalignment resulting from variations in the load imposed thereon, the respective reaches of each chain extending into the master link thereof, being independently engaged and retained by separate link pins adapted to perform the additional function of accommodating a sprocket tooth therebetween for the transmission of power between the sprocket and chain.

Numerous other objects of the embodiment of my invention illustrated and described, as well as advantages to be derived from the use of various modifications thereof, will be apparent to those of skill in the art upon an examination of the following description read in the light of the accompanying drawings, in which:

Fig. 1 is a side elevation of a master link embodying principal features of my invention;

Fig. 2 is a perspective view taken from the rod-engaging end of the master link shown in Fig. 1;

Fig. 3 is a sectional view of a link taken on line 3—3 of Fig. 1 depicting a chain in operative relationship therewith;

Fig. 4 is a perspective view of the link taken from the chain-engaging end thereof and illustrating particularly the means for preventing disengagement of the link pins;

Fig. 5 is a perspective view of one of the link pins;

Fig. 6 is a plan view of an assembly embodying two master links forming parts of two endless chains adapted for synchronous operation, the intermediate connective being partially broken away.

Referring more in detail to the drawings, the numerals of which indicate similar parts throughout the several views, 10 designates a master link fitting, generally circular in cross-section and tapered at one end. The last-named end of fitting 10 is coaxially bored as at 11 to uniform diameter for the slidable reception of a rod or other correspondingly-shaped connective forming a part of laterally-disposed mechanism to be operatively associated with the link as is hereinafter described. The opposite end of fitting 10 is transversely cut away, forming a slot 12 of sufficient width to accommodate a chain 13 of the size with which the master link is to form a part. Between slot 12 and the bore 11, a wall 14 is formed having a flat surface 15 lying in a plane forming a right angle with the axis of the fitting. At the opposite side of slot 12 a segment of the adjacent end of the fitting is also cut away on a line parallel with the bottom 16 of slot 12, which is flat, but at the opposite side of the axis of the fitting. Slot 12 extends through the axis of the fitting to a depth sufficient to permit the free pivotal movement of links 17 of chain 13 extending therein from opposite sides of the fitting, with the center line of links 17 lying in a plane passing through the axis of the fitting.

The outer section 18 of fitting 10 is formed with two holes spaced apart a distance equal to the distance between the link pins 19 of chain 13 to be assembled therewith, and are arranged in a plane coinciding with the axis of the fitting parallel with the bottom 16 of slot 12. The wall 14 is formed with complementary threaded openings to receive the threaded ends 20 of a pair of link pins 21 projected through the respective holes in the outer section 18.

A master link of the character described is adapted for assembly with a conventional type chain 13 by the removal from the latter of two adjacent link pins 19 with which said chains are equipped. The end links 17 of the respective reaches of the chain thus separated are inserted into slot 12, and the holes in the free ends thereof, from which the link pins 19 were removed, are aligned with the holes in the outer section 18. The links 22, theretofore separated from the chain 13 by the removal of the pair of link pins 19, are then replaced, flanking the outer surfaces of respective links 17 with the openings in their ends registering with the holes in the outer section 18. Sprocket-engaging spacer collars 23, identical with the other collars 24 of the chain, are similarly positioned between the series of complementary links 17 and 22. The link pins 21 of the master links are then inserted through the holes, links 17 and 22 and spacers 23, and are threaded into the opposite wall 14 of fitting 10.

The head 25 of each pin 21 is formed with a transverse hole therein, and a wire 26 is projected through the holes in both heads to prevent loosening of pins 21 to an extent which would interfere with effective operation of the apparatus, the ends of the wire being twisted together as at 27 to obviate disengagement thereof.

It will be observed that the links 17 extending into slot 12 from opposite sides thereof and forming parts of respective reaches of chain 13 joined by the master link are independently pivoted on the respective pins 21. Moreover, as the collars 23, encircling the respective pins 21, are spaced apart the same distance as the collars 24 carried by adjoining link pins 19 of the rest of the chain and are accessible through the slot 12, the reach of the chain in which the master link or links is placed is adapted to pass over and engage operatively with a sprocket (not shown) by which the chain is carried in precisely the same manner as do the other sections of the chain. The fitting 10 is accordingly arranged on chain 13 with the bridging section 28 thereof which spans the slot 12, overhanging the outside of the chain loop so as not to interfere with engagement of the sprocket during operation.

While in the embodiment illustrated the slot 12 in the master link is of sufficient width to accommodate links 22, and the inclusion of these links contributes strength to the assembly, as well as reduces the friction upon links 17, by spacing the latter from the sides of slot 12, it will be appreciated that these links 22 may be omitted in modifications hereof as they are not essential to the functioning of the other parts as described. In such case it is desirable that slot 12 be somewhat narrower so as to obviate excessive lateral play of the links 17 therein.

The bore 11 of the master link thus provides a housing for the reception of a rod element, (shown in Fig. 6, hereinafter described) comprising a part of mechanism to be carried by the chain in response to actuation of the latter or which, in accordance with particular utilities hereof, may transmit motion to the chain from laterally-disposed driving members. Where desirable, the rod or other device adapted for insertion into the bore 11 of fitting 10 may be secured therein by screws or other conventional means. However, in most constructions it is preferred that the connection between the master link and the auxiliary equipment be expansible and contractible, and accordingly the rod accommodated in the fitting should fit the bore 11 snugly enough to obviate lateral play between these parts to an extent which would permit their disengagement during operation, without restricting the longitudinal movement necessary to assure compensation for lateral misadjustment of the spacing of the chain and the auxiliary mechanism coupled therewith.

In most structures of the character contemplated, it is desirable that the engagement between the master link and the respective adjoining links 17 should embody the same qualities of flexibility as exist between the other adjoining links of the chain. Either a greater or lesser degree of flexibility may be incorporated into the association of the master link and chain; however, by slightly varying the width of slot 12 relative to the width of the chain.

In Fig. 6 I have illustrated a particular application of my invention to a double endless chain construction. The chains 13 are equipped with master links, each arranged therein so as to project laterally toward the opposite chain. The rod 29 is merely illustrative of any expedient carried by the apparatus to be associated with the chain, e. g., a crosshead or the like. Power applied to the chains to effect their synchronous operation is transmitted by the master links through the rod 29 or to the mechanism (not shown) carried by the rod; and as the motion of each master link is transmitted to the other thereof through the rod 29 or other apparatus of which the rod is illustrative, the resultant power is balanced between the chains, largely obviating distorting lateral strain thereon.

The single embodiment of my invention illustrated and described is susceptible, as will be obvious to those of skill in the art, to numerous changes in size, design, shape and number of the various parts, and, moreover, a single master link embodying the structural features hereinabove emphasized may be formed to project from opposite sides of the chain for connection to separate devices to which power is thereby transmitted, or to separate elements of a single yoke overhanging the chain; the pins 21 may be of any type well known in the art, and conventional means may be resorted to to prevent inadvertent displacement of pins 21, all without departing from the spirit of my invention as defined in the appended claims.

What I claim and desire to secure by Letters Patent is:

1. In a chain structure, a coupling having an elongated bore of a length less than that of the coupling and a slot therein spaced from the bore and extending transversely through said coupling, a pair of link pins extending through said slot parallel but eccentric to the major axis of said coupling, and chain links pivoted on said pins, respectively.

2. In a chain structure, a rod, a tubular member telescopically fitted over and slidable on one end of said rod, a pair of link pins secured in spaced parallel relation in one end of said member offset to opposite sides of the longitudinal axis of the latter, and a chain comprising links pivoted on said pins, respectively.

3. In a chain structure, a coupling having a bore of a length less than the length of said coupling, a rod slidable in the bore of said coupling and projecting from one end of the latter, a transverse slot in the opposite end of said coupling, a pair of pins extending through said last-named end of said coupling and through said slot, said pins being threaded in the opposite wall of said slot and eccentrically disposed with respect to the longitudinal axis of the coupling, and a chain comprising links pivoted on said pins, respectively, whereby said coupling and pins flexibly join said links of said chain together and transmit lateral motion to said rod from said chain.

4. In a chain structure, a pair of couplings, each having a bore, a rod having its ends slidably received within the bores of said couplings, respectively, a transverse slot in each coupling, a pair of pins projecting through said slot in each coupling extending parallel but offset from the major axis of said coupling, a chain comprising two pair of links projecting into the slot of one of said couplings from opposite sides, respectively, and pivoted on said respective pins of said last-named coupling, and a second chain comprising two pair of links projecting into the slot of the other of said couplings from opposite sides thereof and pivoted on said respective pins associated with said last-named coupling, whereby said chains are effective to transmit motion laterally to the ends of said rod.

5. In a chain structure, a work-engaging member, a pair of parallel link pins secured in one end of said member offset to opposite sides of the major axis of said member, and a chain comprising a pair of links having ends thereof pivoted on said pins, respectively, and a link pin pivotally associated with the opposite end of each of said links, the distances between the link pins of adjoining pairs thereof being substantially equal.

6. In a chain structure, a work-engaging member, a pair of link pins carried in spaced parallel relationship in one end of said member offset to opposite sides of an axis of the latter, and a chain comprising links pivoted on said pins, respectively.

LUTHER A. BLACKBURN.

REFERENCES CITED

The following references are of record in the file of this patent:

UNITED STATES PATENTS

| Number | Name | Date |
|---|---|---|
| 401,285 | Loree | Apr. 9, 1889 |
| 1,215,596 | Wescott | Feb. 13, 1917 |
| 1,867,510 | Kershaw et al. | July 12, 1932 |